(12) United States Patent
Macpherson (10) Patent No.: US 8,833,305 B2
(45) Date of Patent: Sep. 16, 2014

(54) PET FEEDING ASSEMBLY AND METHOD OF USE

(76) Inventor: Holly Macpherson, Stuart, FL (US)

( * ) Notice: Subject to any disclaimer, the term of this patent is extended or adjusted under 35 U.S.C. 154(b) by 169 days.

(21) Appl. No.: 13/315,562

(22) Filed: Dec. 9, 2011

(65) Prior Publication Data

US 2013/0145990 A1 Jun. 13, 2013

(51) Int. Cl.
*A01K 5/00* (2006.01)

(52) U.S. Cl.
USPC .......................................... 119/61.5; 119/63

(58) Field of Classification Search
USPC .............. 119/61.5, 61.57, 61.3, 63, 416–437, 119/51.4, 59
See application file for complete search history.

(56) References Cited

U.S. PATENT DOCUMENTS

| | | | |
|---|---|---|---|
| 2,659,345 A | 11/1953 | Herbert | |
| 2,791,985 A | 5/1957 | Bragg | |
| 2,797,662 A * | 7/1957 | Adams | 119/52.4 |
| 2,842,096 A | 7/1958 | Bradfield | |
| 2,845,896 A * | 8/1958 | Copeland | 119/51.01 |
| 2,858,801 A * | 11/1958 | Chance | 119/52.4 |
| 3,927,645 A * | 12/1975 | Varner | 119/51.01 |
| 4,029,051 A | 6/1977 | McKinney | |
| 4,334,501 A | 6/1982 | McDaniel et al. | |
| 4,699,089 A | 10/1987 | Teschke | |
| 5,133,291 A | 7/1992 | Justice | |
| 5,176,104 A | 1/1993 | Baxter | |
| 5,222,990 A | 6/1993 | Elliott | |
| 5,678,509 A | 10/1997 | Dillon | |
| 6,360,689 B1 | 3/2002 | Weinert | |
| 6,588,367 B1 | 7/2003 | MacManus | |
| D492,452 S | 6/2004 | White | |
| 6,951,187 B1 | 10/2005 | McKoy | |
| D606,711 S | 12/2009 | Becattini, Jr. et al. | |
| 7,874,265 B1 * | 1/2011 | Addleman | 119/63 |
| 8,267,105 B1 * | 9/2012 | Denmark, Jr. | 135/117 |
| 2006/0272584 A1 | 12/2006 | Sprague | |
| 2009/0241843 A1 * | 10/2009 | Becattini et al. | 119/51.5 |
| 2010/0024736 A1 | 2/2010 | Davis | |
| 2010/0199919 A1 | 8/2010 | Mariner | |
| 2012/0037080 A1 * | 2/2012 | Hepp et al. | 119/52.3 |

OTHER PUBLICATIONS http://www.orvis.com/store/product.aspx?pf_id=1E7T.
http://www.frontgate.com/x/22575?SourceCode=XX23159&cm_mmc=Comparison%20Shopping-_-Google%20Base-_-NA-_-NA.

* cited by examiner

*Primary Examiner* — Rob Swiatek
*Assistant Examiner* — Danielle Clerkley
(74) *Attorney, Agent, or Firm* — The Concept Law Group, P.A.; Scott D. Smiley; Mark C. Johnson (57) ABSTRACT

A cat feeder assembly and method of providing a cat feeder assembly having at least three walls defining a food placement zone with a food container, with each wall having a top end and a bottom end, and a protective awning coupled to the housing structure and having a selectively adjustable height. The protective awning having a leading edge defining a primary height barrier and at least one secondary height barrier, with the secondary height barrier being located between the primary height barrier and the at least two walls. Both height barriers projecting a first and second imaginary plane substantially parallel to each other and defining a keep-out zone directly under the awning and substantially adjacent to the food container. The method further includes selectively adjusting the protective awning to the shoulder area of a cat the user desires to feed from the food placement zone.

20 Claims, 8 Drawing Sheets

PET FEEDING ASSEMBLY AND METHOD OF USE

FIELD OF THE INVENTION

The present invention relates generally to an assembly to feed animals, and, more particularly, relates to an adjustable feeder assembly for use with household pets, specifically cats.

BACKGROUND OF THE INVENTION

One facet of maintaining household animals, i.e., pets, includes feeding them on a daily basis. For those owners who have more than one pet, the many challenges, at least when it comes time to feed the animals, are of no surprise. Those challenges are even more apparent when an owner has a multi-pet household that includes both cats and dogs. Generally, owners of cats place their food and water out all day for the cat to periodically visit as needed. Owners of dogs, because of their proclivities to excessively feed, place their food out in portions only once or twice a day. As dogs are generally known to eat a cat's food if left unattended, a system of protecting the cat's food is needed.

At least one known cat feeder system is described in U.S. Patent Publication No. 2010/0024736 and involves a box with small openings for the cat to enter and exit, with the opening being a defined size small enough for the cat to pass through and, at the same time, exclude larger pets, such as dogs. Box-type feeder systems require the cat to fully enter a confined and enclosed area, which is disagreeable to many cats, with the confined space discouraging and/or preventing those cats from entering the box to feed. Even worse, said feeder systems require the owner to place the food or water dish inside the box, making it cumbersome and inconvenient for an owner to constantly access the interior of the box and to clean up any mess or spillage from the food and water bowl. Known cat feeder devices requiring the owner to place the dish or bowl inside of the box also do not prevent the cat from making a mess as the bowl or dish is not prevented from moving. Moreover, those cat feeder devices that do have non-removable feeding bowls or sections make it very difficult to clean those sections when desired, as they are not easily maneuverable to clean.

Other known animal feeder devices that are intended to prevent larger animals from feeding on a smaller animal's food use an angled overhang or barrier. One such structure is shown in U.S. Pat. No. 2,842,096. The barrier or overhang is attached to a hinge and is in the form of a panel-like structure. The panel-like structure works to preclude larger animals from eating at specific food stations when attempting to access the feeder systems from the front. The structure does so by angling said barriers or overhangs to a certain degree of angle, thereby causing a larger animal to have to crouch in order to enter the box or to access the food areas. As the animal does not particularly like to, or cannot, eat in said position, the small animal's food is supposedly safe from the larger animal. Problematic with these types of feeder apparatuses, however, is the fact that they do not prevent larger animals from simply moving to the side and accessing the food containers from the side of the angled barrier or overhang. As such, those animal feeder apparatus do not prevent an excluded larger animal from the side of the structure to access the food or water. In addition, the structures described in U.S. Pat. No. 2,842,096 and the like are large structures that would not be able to prevent a dog from feeding.

As mentioned directly above, those known animal feeder apparatuses designed to prevent access to larger animals leave the sides of the barrier or overhang unprotected. Another such device is described and shown in U.S. Pat. No. 5,222,990. This pet feeder also utilizes an angled roof to serve as a barrier to exclude larger animals and, as it is intended to be placed outside, to direct debris that may fall on the roof away from the food/water dishes. This design is especially problematic for those owners of dogs and cats in a multi-pet household as it does not prevent a dog or larger animal from also reaching its paw inside to move the food or water around. Although "curiosity killed the cat," it is also known to lead dogs to seek and paw at food, if it is accessible or smelled. Many known cat feeder apparatuses, such as the patent described above, do not prevent a canine from shifting around and trying to remove the area where the food or water is held, nor is the roof adjustable to adapt to animals of various sizes. Additionally, those known animal feeder apparatuses that have a sized aperture for a small animal to stick its head inside to feed, also does not prevent a dog from sticking its paw inside the aperture. Lastly, many known feeder systems that do utilize angled barriers or overhangs are not adjustable to account for the size of the larger animal(s) desired to be excluded or for a small animal as they grow.

Therefore, a need exists to overcome the problems with the prior art as discussed above.

SUMMARY OF THE INVENTION

The invention provides a pet feeding assembly and method of use that overcomes the hereinafore-mentioned disadvantages of the heretofore-known devices and methods of this general type and that allows a cat to comfortably feed from food and/or watering containers within the protective walls while impeding access to dogs or other animals of larger size.

With the foregoing and other objects in view, there is provided, in accordance with the invention, a cat feeder assembly includes a housing structure including at least two walls, each of the at least two walls having a bottom end and a top end, a food placement zone including a food container located between the at least two walls, and a protective awning coupled to the housing structure and having a selectively adjustable height. The awning has a portion extending away from the at least two walls, a leading edge defining a primary height barrier to the food placement zone, and at least one secondary height barrier to the food placement zone, the secondary height barrier being located between the primary height barrier and the at least two walls. In addition, the primary height barrier projects a first imaginary plane and the secondary height barrier projects a second imaginary plane substantially parallel to the first imaginary plane, the first imaginary plane and the second imaginary plane together defining a keep-out zone directly under the awning and substantially adjacent the food container.

In accordance with a further feature of the present invention, the housing structure further includes a roof supported by the at least two walls.

In accordance with an additional feature of the present invention, one of the at least two walls defines a window therein.

In accordance with another feature of the present invention, the housing structure defines a first vertical plane that is substantially parallel and substantially adjacent to the second imaginary plane.

In accordance with one more feature of the present invention, the protective awning includes a first side face and a second side face, where the first and second side faces are substantially continuous surfaces free of openings, i.e., no holes large enough for an animal to reach its head or paw through.

In accordance with yet another feature of the present invention, the first and second side faces are substantially planar.

In accordance with still one more feature of the present invention, each of the first side face and second side face are defined by at least three edges.

In accordance with an additional feature of the present invention, the food container is removably couplable to the housing structure and the food container includes an upper surface, a first feeding dish disposed on the upper surface, and a raised area extending in a direction away from the upper surface.

In accordance with another feature, an embodiment of the present invention also includes a cat feeder assembly having a housing structure including at least two vertical walls, the at least two vertical walls defining a food placement zone therein. Each wall has a bottom end and a top end, defines a first vertical plane substantially adjacent to the food placement zone, and has a roof coupled thereto and presenting an upper barrier to the food placement zone. A food container is removably couplable to the housing structure and located within the food placement zone. A protective awning is coupled to the housing structure and has a selectively adjustable height. The awning extends away from the at least two vertical walls, has a leading edge defining a primary height barrier to the food placement zone, and has a rear food blocking member including a trailing edge, the trailing edge defining at least one secondary height barrier being located between the primary height barrier and the first plane, wherein the primary height barrier projects a first imaginary plane and the secondary height barrier projects a second imaginary plane substantially parallel to the first imaginary plane, the first imaginary plane and the second imaginary plane together defining a keep-out zone substantially adjacent to the food container.

In accordance with the present invention, a method of providing access to pet food includes the step of providing a cat feeder assembly that has a housing structure including at least two walls where each of the at least two walls has a bottom end and a top end. A food placement zone includes a food container located between the at least two walls. A protective awning is coupled to the housing structure and has a selectively adjustable height. The awning has a portion extending away from the at least two walls, a leading edge defining a primary height barrier to the food placement zone, and has at least one secondary height barrier to the food placement zone, the secondary height barrier being located between the primary height barrier and the at least two walls. The primary height barrier projects a first imaginary plane and the secondary height barrier projects a second imaginary plane substantially parallel to the first imaginary plane, the first imaginary plane and the second imaginary plane together defining a keep-out zone directly under the awning and substantially adjacent the food container. The method further includes the step of mechanically adjusting the protective awning to a position that allows an animal of a first size to comfortably access the food placement zone while discriminating against an animal of a second size larger than the first size.

Although the invention is illustrated and described herein as embodied in a pet feeding assembly and method of use, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically.

As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. In this document, the term "longitudinal" should be understood to mean in a direction corresponding to an elongated direction of the leading edge of the protective awning to the back wall of the housing structure.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

DETAILED DESCRIPTION

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

The present invention provides a novel cat feeder apparatus and method designed to allow a cat to feed while excluding larger animals, such as dogs. Embodiments of the invention provide the user with the ability to selectively adjust the height of the area in which the desired animal, e.g., cat, feeds and effectively exclude other animals from accessing the feeding area from the front and the side. In addition, embodiments of the invention provide the user with a removable feeding area that can be quickly and easily accessed to add food or water and to clean.

Figure 1:
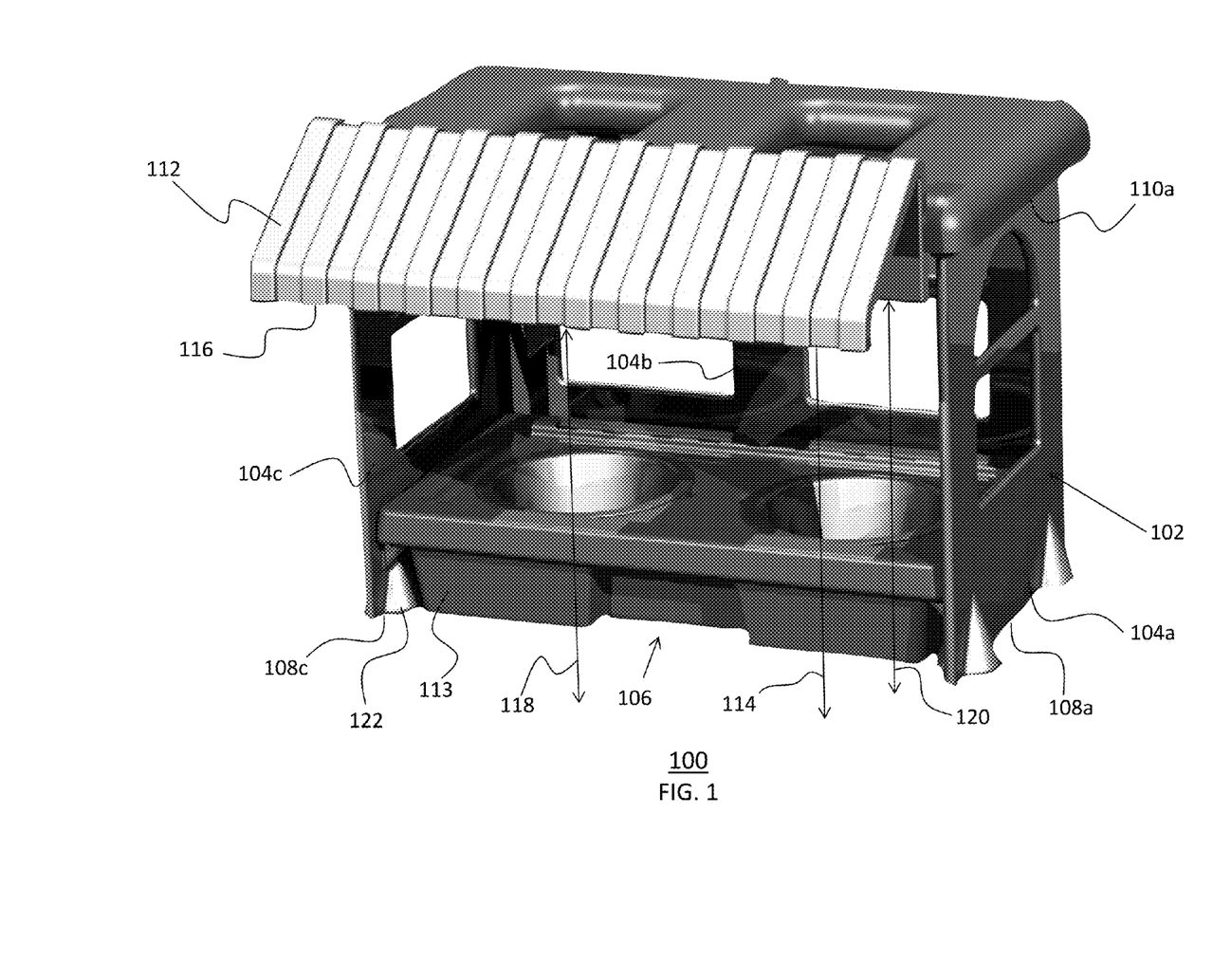
FIG. 1 is a perspective right front view of a cat feeder assembly and shows the protective awning coupled to the housing structure having at least two walls defining a food placement zone with a food container in between in accordance with the present invention.

Referring now to FIG. 1, one embodiment of the present invention is shown in a downward-looking perspective view. FIG. 1 shows several advantageous features of the present invention, but, as will be described below, the invention can be provided in several shapes, sizes, combinations of features and components, and varying numbers and functions of the components. The cat feeder assembly 100 is shown having a housing structure 102 including at least two walls 104 defining a food placement zone 106 therein. Although the embodiment illustrated is shown having three walls 104a-c, other embodiments may include two or more walls in order create the food placement zone 106. Therefore, any reference herein to the three walls shall be considered also a reference to at least two walls. The preferred embodiment of the housing structure 102 has three walls including the two side walls 104a and 104c and one rear wall 104b. Each of the three walls 104a-c is shown having bottom ends 108a-c and top ends 110a-c, with two of the top ends, 110b and 110c, and one of the bottom ends 108b partially hidden. In order to effectively exclude larger animals from feeding on the food or water placed in the food placement zone 106, a protective awning 112 can be seen coupled to the housing structure 102 and extending in a direction away from the three walls 104a-c. The food placement zone 106 is shown having a food container 113 located between and enclosed with the three walls 104a-c. In other embodiments of the invention, certain portions of the food container 113 may actually extend outside of the housing structure 102.

In one embodiment, the bottom ends 108a-c of the three walls 104a-c rest on feet 122 supporting the weight of the housing structure 102. The feet 122 are designed to reduce movement and prevent scratches on the surfaces on which they rest. The walls 104a-c generally have four feet, but may have less than or more than four feet. In other embodiments, the bottom ends 108a-c of the at least three walls 104a-c rest directly on the ground supporting the weight of the housing structure 102.

The protective awning 112 can be seen to have a selectively adjustable height 114. In one embodiment, the protective awning 112 is selectively adjustable to a height 114 between the bottom ends 108a-c and the top ends 110a-c of at least two walls of the housing structure 102, so a user may exclude animals of various sizes or adjustably provide continued access to the food placement zone 106 to a younger cat that continues to grow. In other embodiments, the height 114 may extend above the top ends 110a-c in order to allow the user to remove the food container or insert food directly into the food container.

To effectively exclude access from larger undesired animals from the front of the housing structure 102 the protective awning 112 has a leading edge 116, defining a primary height barrier 118 to the food placement zone 106. Moreover, the user can now protect access to the food from the sides as the protective awning 112 includes at least one secondary height barrier 120 to the food placement zone 106. The height 114 of the protective awning 112 is shown with respect to the leading edge 116 and a surface to which the cat feeder assembly 100 rests. In one embodiment of the present invention, the secondary height barrier 120 is located between the primary height barrier 118 and the three walls 104a-c. In other embodiments the secondary height barrier 120 may extend passed one or more of the three walls 104a-c, but before a portion of the food container 113 holding the food.

Figure 2:
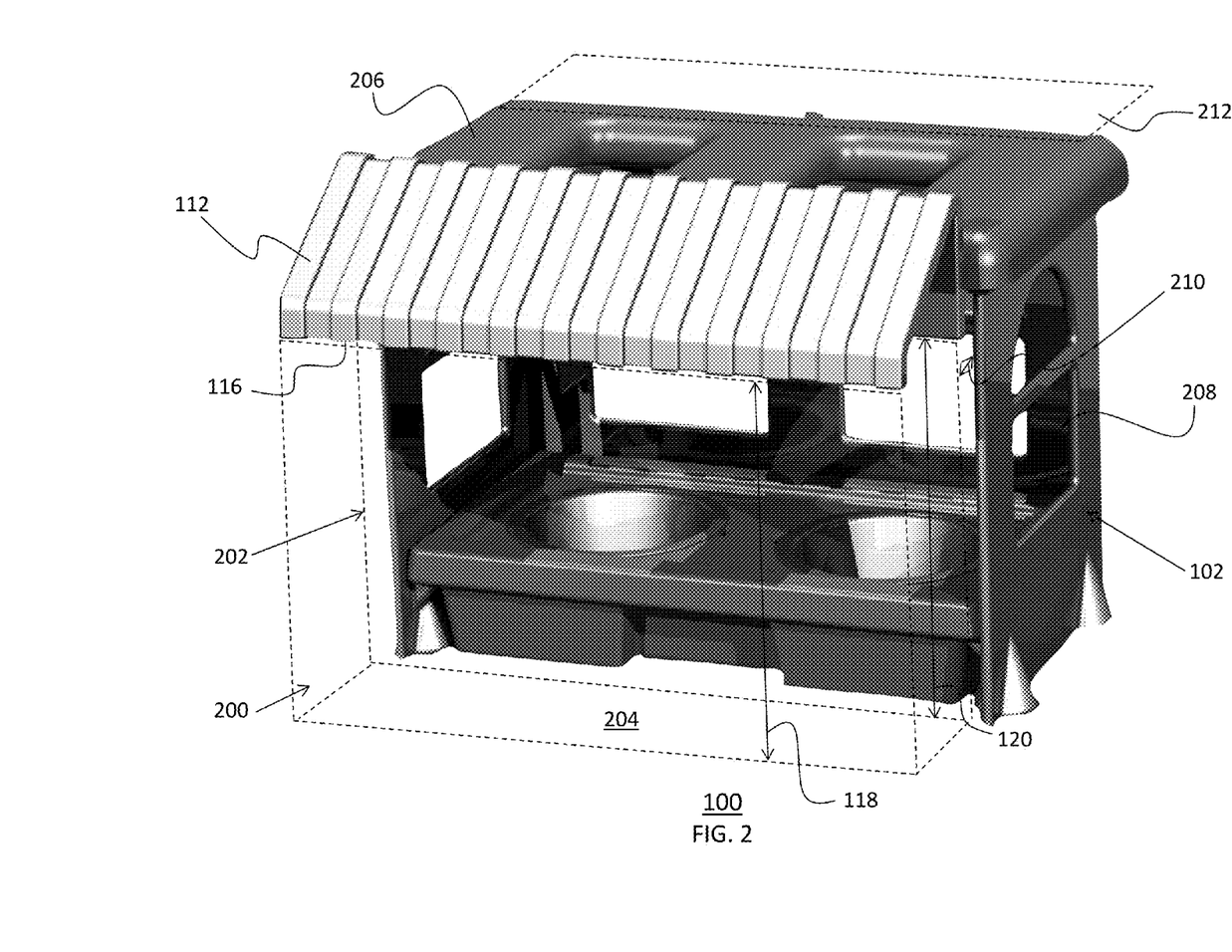
FIG. 2 is a perspective right front view of a cat feeder assembly with a the protective awning having a primary and secondary height barrier projecting an imaginary first and second plane that defines a keep-out zone in accordance with the present invention.

Now referring to FIG. 2, in order to prevent access to the food container 113 the primary height barrier 118 projects a first imaginary plane 200 and the secondary height barrier 120 projects a second imaginary plane 202. The second imaginary plane 202 is shown in this embodiment as being substantially parallel to the first to the first imaginary plane 200. "Substantially parallel," is defined herein as having equal, or approximately equal, distances separating the two planes from each other in more than one point along the planes. To effectively exclude larger undesired animals, the imaginary planes 200, 202 are shown together to define a "keep-out zone 204." The keep-out zone 204 prevents a larger animal, which cannot gain access from the front, from also gaining access to the food container 113 from sides of the housing structure 102. The keep-out zone 204 is directly under the protective awning 112 and substantially adjacent to the food container 113. The term "substantially adjacent" is defined herein as sharing a border or immediately next to, within approximately 2 inches, a border of a surface or referencing body. In one embodiment, the keep out zone 204 is shown in a rectangular shape lying within a distance defined by the at least two walls 104. In other embodiments, as the keep-out zone 204 lays directly under the protective awning 112, the keep-out zone may be any polygonal shape dependent on the shape and design of the protective awning 112 and may also lay outside of the at least two walls 104.

To further reduce access from the food placement zone 106 by any animals not desired by the user, one embodiment of the housing structure 102 includes a roof 206 coupled to at least two of the three walls 104a-c. The roof 206 can be seen to create an upper barrier 212, as shown with the imaginary plane 214 extending out from the upper barrier 212, such that a larger animal may not access the food container 113 from the top of the housing structure 102. In other embodiments the housing structure 102 does not have a roof 206, but rather uses the three watts 104a-c to enclose the food placement zone 106. Moreover, in one embodiment of the present invention, the three walls 104a-c and the roof 206 are injection molded from plastic and are a single piece. In other embodiments, the three walk 104a-c and roof 206 are either separately molded from a plastic-based material, a light-weight metallic material, composite materials, or others, and are assembled together or molded into one piece from said materials. Although the roof 206 may be molded into one piece with the at least three walls 104a-c, in other embodiments, the roof 206 is coupled to the at least three walls 104a-c using a key/keyway, adhesives, or other attachment methods.

The housing structure 102 is also shown having at least one of the three walls 104a-c with a window 208 disposed therein. The window 208 is generally just an opening, but may be made of glass or transparent plastic. The window allows the cat to see what is inside the enclosure and, once inside, reduce any claustrophobia-type feelings. The window 208 also allows the user to monitor the food or water in the food placement zone 106. In addition, the preferred embodiment has multiple windows, with a window 208 on each of the three walls 104a-c as well as the roof 206. Additional windows 208 provide optimal visibility for the user and the cat and create an open and accepting environment for the cat.

Figure 3:
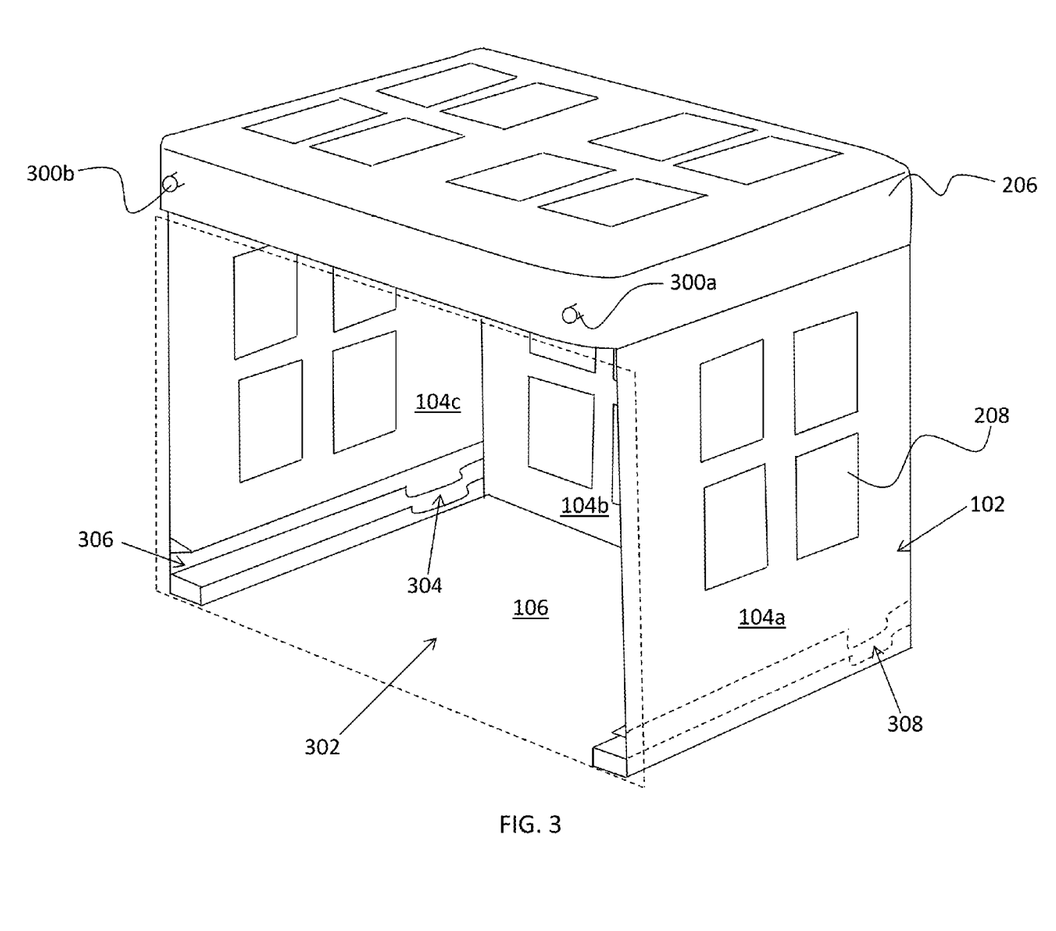
FIG. 3 is a perspective right front fragmentary view of the housing structure of FIG. 1 with two of the walls defining a first vertical plane in accordance with an embodiment of the present invention.

Referring now to FIG. 3, one embodiment of the present invention is shown with the protective awning 112 and food container 113 removed. As previously mentioned, the protective awning 112 is selectively adjustable in order to exclude various sized animals and allow only the desired cats to feed or drink from the food placement zone 106. As such, in one embodiment, the housing structure 102, more particularly, the roof 206, has projections 300a-b extending thereon. These projections 300a-b fit within a portion of the protective awning 112 (not shown in FIG. 3) and allow the protective awning 112 to slide up or down between the bottom ends 108a-c and top ends 110a-c of the at least two walls 104a-c. In other embodiments, housing structure 102 may use other mechanisms to attach the protective awning 112, while still allowing it to translate in the direction as mention above, such as latches, tracks, or other modes of attachment and translation. Although FIG. 3 illustrates the attaching mechanism for the protective awning 112, or the projections 300a-b, located on the roof 206, other embodiments of the present invention have the projections 300a-b attached to the two side walls 104a&c. In yet further embodiments, the present invention may have the projections 300a-b, or other attachment mechanisms located partially on one side wall and on the roof 206. Having a protective awning, opposed to other devises, the cat does not have to completely enter an enclosed area, which can be uncomfortable or daunting for certain cats, but just partially inserts its body to eat or drink.

In yet further embodiments of the present invention, the protective awning 112 may be selectively adjustable between the bottom ends 108a-c and top ends 110a-c of the at least two walls 104a-c automatically without human intervention. More generally speaking, the protective awning can function as a type of garage door that selectively opens and closes when desired. In said embodiment, the cat(s) desired to have access to the food placement zone 106 can be provided with a wireless transmitter that sends signals, e.g., infrared, RF, Bluetooth, or other protocols, or a similar type device that sends a signal that is received by the cat feeder assembly 100 and causes a motor or other mechanism to automatically move, e.g., raise or tilt the protective awning 112, thereby granting access to food placement zone 106 to the desired animal. When the cat(s) leave the food placement zone 106, a receiver on the cat feeder assembly 100 senses the loss of signal and closes the protective awning 112 to a predetermined position so that comparably-sized, or smaller, dogs would not have access to the food placement zone. Wireless transmitters and receivers and motors are well known in the art of wireless communication and are not explained in further detail here, nor is such a description necessary for an understanding of the present invention.

In one embodiment, the housing structure 102, or as in other embodiments the at least two walls 104a-c, defines a first vertical plane 302. To ensure integrity to the food placement zone 106, and the food container 113 inserted therein, the first vertical plane 302 is substantially adjacent and substantially parallel to the second imaginary plane 202. Now referring to both FIGS. 2 and 3 in conjunction with one another, in one embodiment, as the protective awning 112 is coupled to and translated by the projections 300a-b on the roof 206, the first vertical plane 302 may be offset a length 210 from the second imaginary left plane 202. To prevent the larger animals from inserting their paws or noses in the opened area, the length 210, in one embodiment, is less than approximately 2 inches. In other embodiments, the length 210 is less than 0.25 inches. In yet further embodiments, if the protective awning 112 is coupled to two of the side walls 104a and 104c, the length 210 will be negligible. Now, advantageously, the side access to the food placement zone 106 is protected and does not allow a dog's mouth to easily reach the cat's food or water, as the dog now has to achieve the same difficulty or inability as it would have when trying to access the food placement 106 from the leading edge 116.

Figure 4:
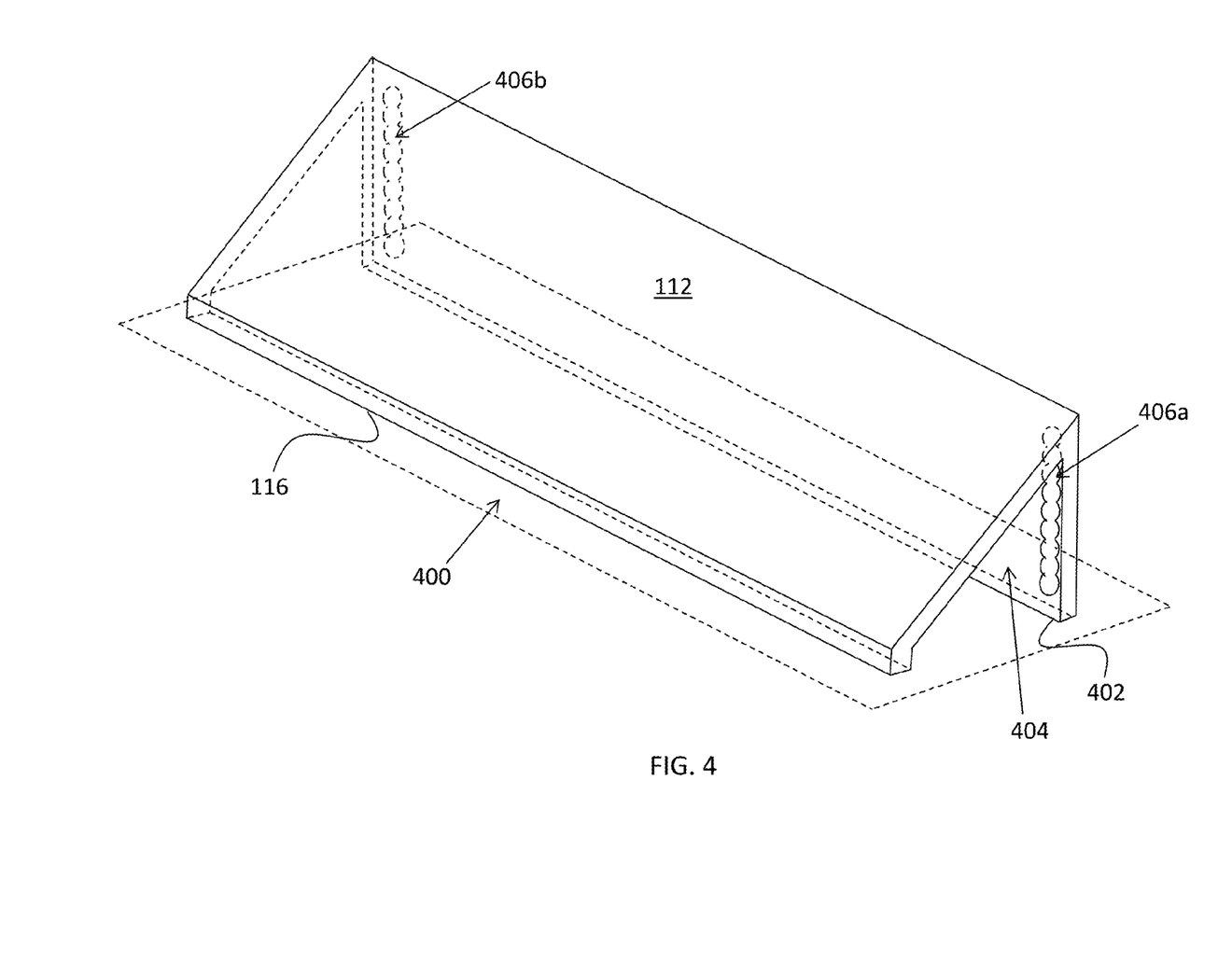
FIG. 4 is a cross-sectional, fragmentary, perspective view of the protective awning of FIG. 1 defining a second plane in accordance with an embodiment of the present invention.
Figure 5:
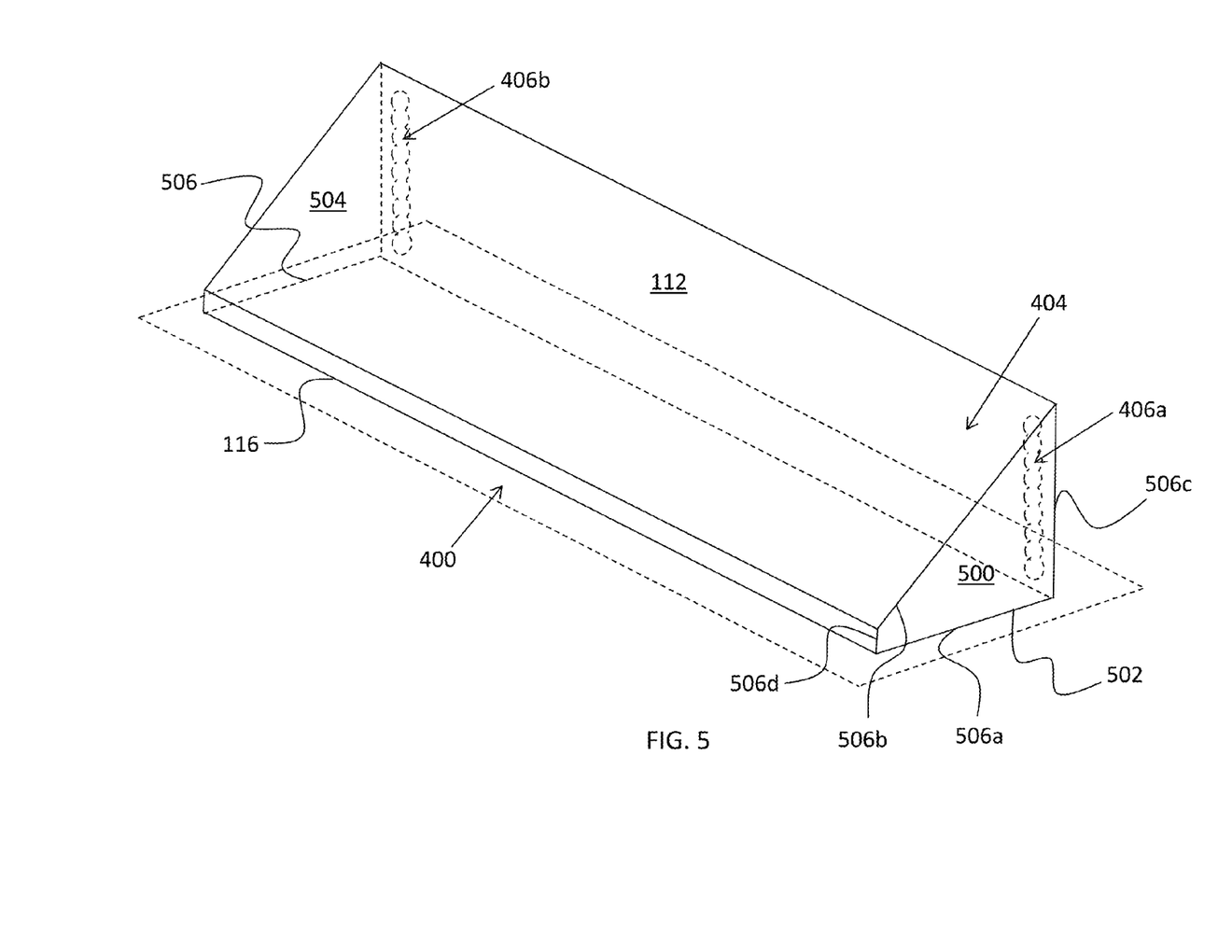
FIG. 5 is a cross-sectional, fragmentary, perspective view of an additional embodiment of the protective awning of FIG. 1 also defining a second plane in accordance with the present invention.

Both FIGS. 4 and 5 illustrate multiple embodiments of the protective awning 112 in accordance with the present invention. The protective awning 112 is shown having a second plane 400 defined by the leading edge 116 and a trailing edge 402. In one embodiment, the second plane 400 is planar, or generally flat. In other embodiments, the second plane 400 may have a curvature, but the preferred embodiment is to have a generally flat plane to reduce accessibility to the food placement zone. In the preferred embodiment of the present invention, and to effectively exclude those larger undesired animals from feeding in the food placement zone 106, the second plane 400 also is substantially perpendicular to the first vertical plane 302. The term "substantially perpendicular" is defined herein as having two planes, lines, or referenced surfaces that are at ninety degree angles, or within about a twenty five degree variance of ninety degrees, of each other in more than one point along the two planes, lines, or referenced surfaces.

The trailing edge 402 is shown defined by a rear food blocking member 404. In one embodiment the rear food blocking member 404 is part and parcel of the protective awning 112, as illustrated. In other embodiments, the food blocking member 404 may be located on or coupled to the at least two walls 104a-c. In yet another embodiment, the food blocking member 404 may be located on or coupled to the roof.

To maintain the durability and integrity of the food placement zone 106, the protective awning 112, according to one embodiment, is made with a light-weight metallic material. In other embodiments the protective awning 112 is made with a plastic-based material, composite, or other light-weight material able to withstand forces generated by larger sized animals such as dogs. Also shown in FIGS. 4 and 5 are holes 406a-b designed on the protective awning 112 to couple with projections 300a-b located on the roof 206, in accordance with one exemplary embodiment of the present invention. In other embodiments, the holes 406a-b may be in various locations on the protective awning 112 or there may be various coupling mechanisms along the protective awning 112 to selectively adjust the height 114, as discussed above.

Now referring to FIG. 5, FIG. 5 illustrates another exemplary feature of the protective awning 112. The awning 112 is shown having a first side face 500, which includes a left side edge 502 and a second side face 504, which includes a right side edge 506. In one embodiment of the present invention, in order to further limit access to the food placement zone 106, both the first side face 500 and the second side face 502 are substantially enclosed and substantially planar. The term "substantially enclosed" is defined herein as having no significant openings in the sides or located on the referenced surface or no openings greater than approximately two-three inches separating the largest lengths defining any opening. Although in one embodiment of the present invention, the side faces 500, 504 are described as being substantially planar, or a generally flat surface, in other embodiments the side faces may have a curvature that is either concave or convex in nature. Additionally, in one embodiment of the present invention, the substantially enclosed side faces 500, 504 are defined by at least three edges 506a-c. Having at least three edges 306a-d, or four, as exemplified on the side faces 500, 504, further ensures the integrity and access to the food placement zone 106 from the sides of the housing 100. Other embodiments of the present invention may include more than three edges substantially enclosing first side faces 500, 504.

Figure 6:
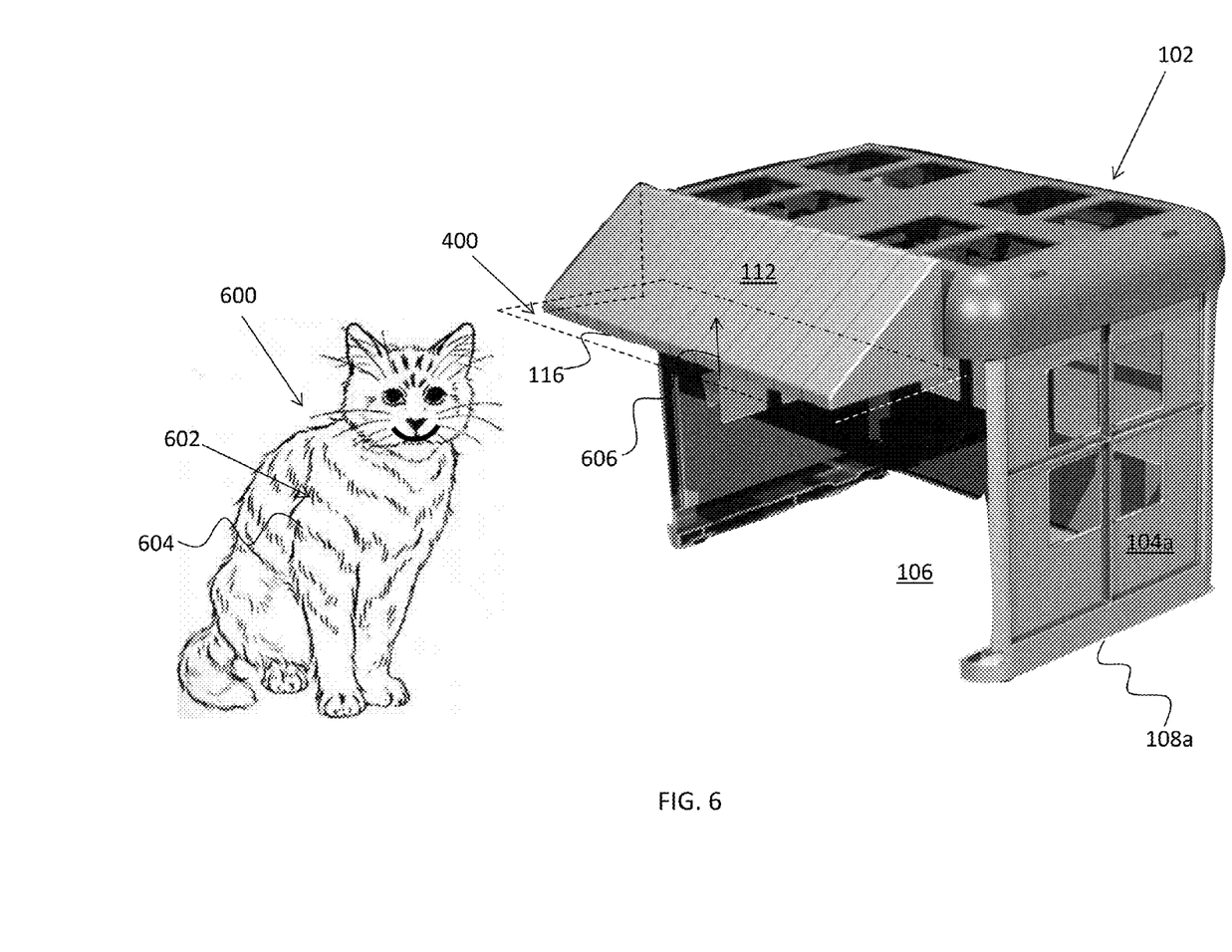
FIG. 6 is a perspective view of the cat feeder assembly showing the protective awning coupled to the housing structure with the second plane defined by the protective awning to be adjusted to be co-planar with the shoulder area of a cat thereby excluding larger animals in accordance the present invention.

Now referring to FIG. 6, a cat 600 is shown near the inventive housing structure 102 and, in this example, is intended to be allowed to access the food placement zone 106. FIG. 6 illustrates that in order to exclude those undesired larger animals, particularly dogs, from feeding on a cat's food or water placed in the food placement zone 106, the user will mechanical adjust the protective awning 112 to a position such that the second plane 400 is substantially co-planar with or lower than a height of the cat's shoulders 602. The term "substantially co-planar" is defined herein as two or more points, planes, or surfaces lying on or near the same plane.

Generally, one characteristic of cats is that they crouch to eat food or water. The shoulder area 602 is defined as the approximate area extending from around the upper front leg 604 to just below the head of the cat 600. So, the user advantageously can set the protective awning 112 in relation to the size of the cat 600 so that it may fit under the protective awning 112, while excluding those larger animals from accessing the food placement zone 106 from the front and the sides. Moreover, when the user desires to insert the food, or to clean the area, the protective awning 112 conveniently and efficiently translates in a direction 606 away from the bottom end 108a of one of the side walls 104a.

For convenience and to maintain the integrity of the food and water placed in the food placement zone 106, the cat feeder assembly 100 provides a food container 113 that is removably couplable. As previously mentioned, the food container is to be inserted within the food placement zone 106. In one embodiment of the present invention, the user may place the food and/or water bowls directly in the food placement zone 106 and then adjust the protective awning 112 accordingly. In another embodiment, the food container 113 is inserted within the food placement zone 106 and provides more convenient means for the user not only to insert and remove the food into the food placement zone 106, but also for the cleaning of the area where the cat eats. The food container 113 may be weighted down, or have a mechanism to couple the food container 113 to the housing structure 102. Looking at both FIGS. 7 and 8, the food container 113 can be seen to have a bottom portion 800 (shown in FIG. 8) and an upper feeding portion 700 (shown in FIG. 7), with a first length 702 separating the bottom portion 800 and upper feeding portion 700. As the second plane 400, defined by the protective awning 112, is generally set around the shoulder area 602 of the cat 600, the first length 702 should be, according to the preferred embodiment, less than the length defined by the primary height barrier 118 and secondary height barrier 120 (shown in FIG. 1). In other embodiments, the first length 702 may be greater than said lengths defined by the height barriers 118, 120, but may reduce the ease of the cat to feed.

Figure 7:
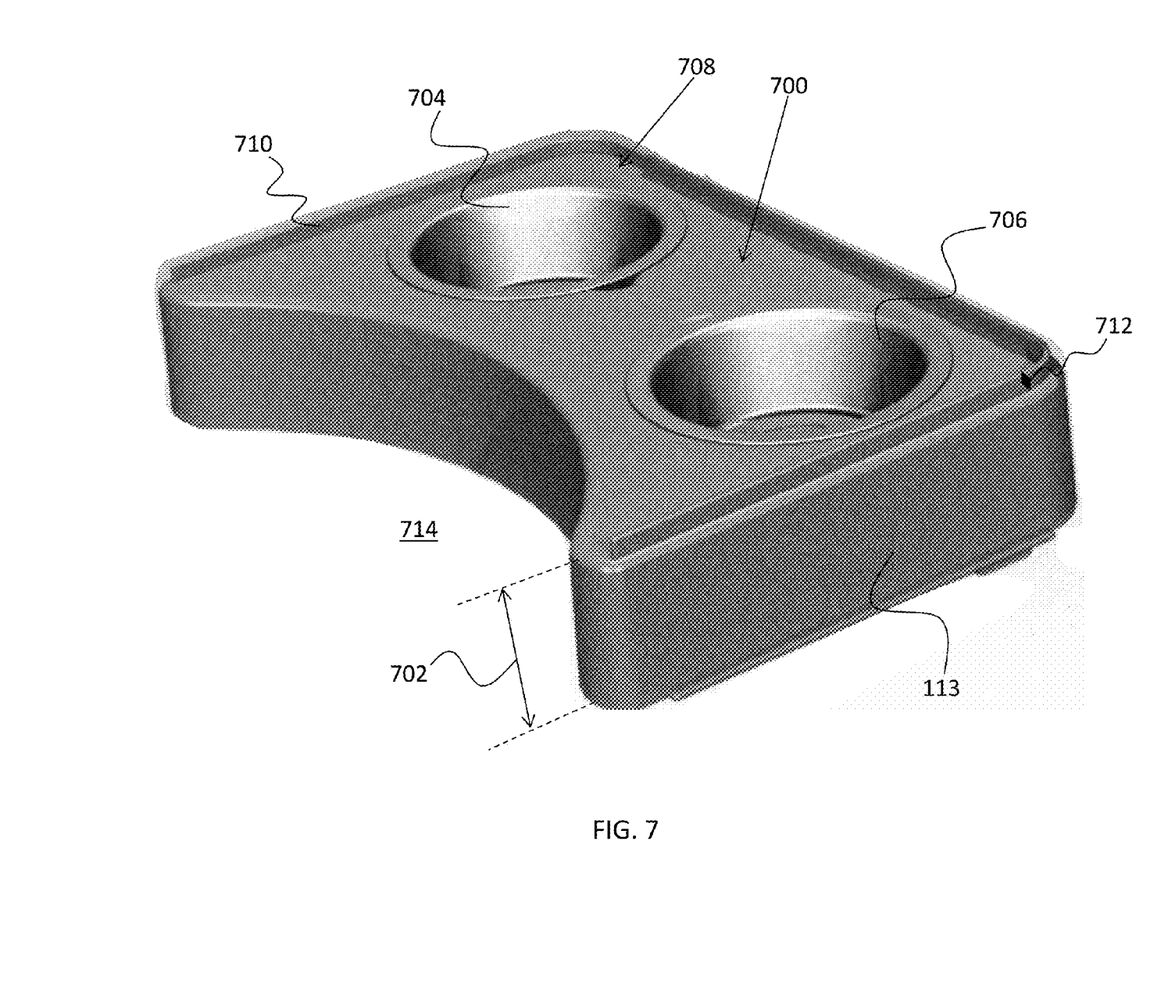
FIG. 7 is a fragmentary, perspective, downward-looking view of a food container with two feeding dishes disposed thereon in accordance with an exemplary embodiment of the present invention.

Moreover, according to one embodiment shown in FIG. 7, a first feeding dish 704 and second feeding dish 706 are disposed on the upper feeding portion 700 of the food container 113. In other embodiments, the food container 113 may have only a first feeding dish 704 disposed on the upper feeding portion 700. For further ease and convenience to the user when cleaning food, not only may the food container 113 be removable, but also the feeding dishes 704, 706 may be removable from the food container 113. In other embodiments, the feeding dishes 704, 706 may be molded into and permanently affixed on the food container 113. To further reduce access to the feeding dishes of larger animals, the location should be placed toward the back 708 of the food container 113. To further reduce spillage and facilitate cleaning up any potential mess, the food container 113 has a raised area 710 extending a height 712 less than the first length 702 in a direction away from the upper feeding portion 700. In other embodiments, the food container 113 does not have a raised area 710.

In addition, the food container 113 may have a portion 714 shaped to accommodate the cat when crouched under the protective awning 112. In other embodiments, the food container 113 does not have said portion 714 and the food container 113 extends approximately to the first vertical plane 302 (shown in FIG. 3). In yet further embodiments, the food container 113 may have a handle located thereon to accommodate the user to pull out the container 113 out when desired. The food container 113 may be made with a plastic-based material formed into one piece, or assembled from various pieces. In other embodiments, the food container 113 may be made with a light-weight metallic material, composite material, or other durable material able to withstand a force exerted by larger animals, such as dogs.

Figure 8:
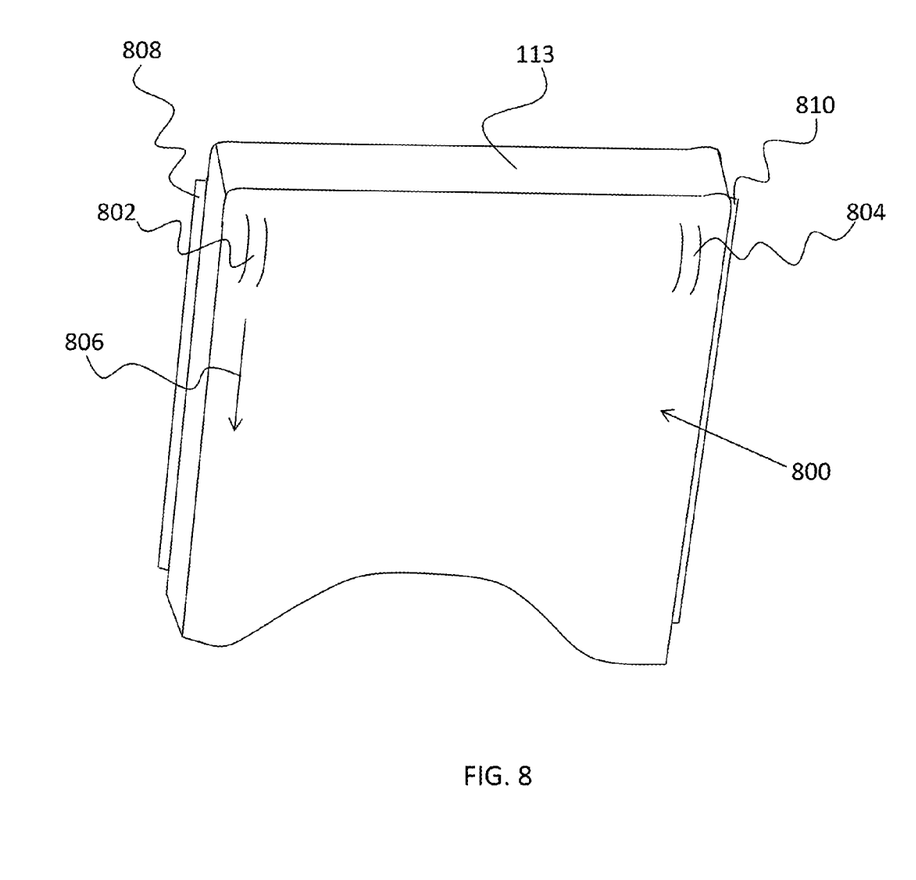
FIG. 8 is a fragmentary, perspective, bottom view of the food container with a portion shaped to couple with at least one wall of the at least three walls in accordance with an embodiment of the present invention.

Now referring to FIG. 8, in one embodiment of the present invention, the food container 113 includes a portion 802 shaped to couple and engage with a portion 304 (shown in FIG. 3) of at least one of the at least two walls 104a-c. The coupling portion 802 of the food container 113 secures the food container 113 when inserted within the food placement zone 106 (shown in FIG. 1) and prevents an animal from attempting to remove the food container 113. Although one coupling portion 802 would suffice to secure the food container 113 while within the food placement zone 106, the preferred embodiment provides a second coupling portion 804 in order to further secure the food container 113. The coupling portion 802 is shaped to fit within the portion 304 (shown in FIG. 3) created by at least one of the at least three walls 104a-c such that it can withstand forces exerted going toward the first plane, as shown by the arrow 806 in FIG. 8. In yet further embodiments, the food container 113 may have a first portion 808 that further secures the container 113 in place while inserted in the food placement zone 106. To further secure the food container 113, a second portion 308 may also be included on the at least two walls 104a-c.

Referring still to FIG. 3, in one embodiment, at least one of the three walls 104a-c is further shaped to engage with a portion 808 of the food container 113. The user may slide the food container 113 along the portion 306 defined by at least one wall 104c. In other embodiments, an additional wall, such as the right wall 104a, may have additional portion shaped to engage with the second portion 810 of the food container 113. Moreover, the amount of coupling portions 802, 804 will determine how many, if any, walls are shaped to engage with said portions 802, 804 of the food container 113. In other embodiments, the walls may not have sliding or retaining portions 306 defined by one or more of the at least two walls 104a-c, rather the food container 113 will be dropped, and not slid, onto the portion 304 created by at least one of the three walls 104a-c.

In an additional embodiment of the present invention, the food container 113 and/or any of the walls 104 and/or the top portion 110a and/or the awning 112 can include a space for holding water, sand, extra food, or any material suitable for adding weight to the device for the purpose of holding it down and adding stability to the cat feeder assembly.

A cat feeder assembly and method of excluding larger animals from the food dish of small animals has been disclosed that features a housing structure with at least two vertical walls and a protective awning having left, right, and front height barriers that is coupled to the structure and selectively adjustable allowing the user to effectively and conveniently exclude larger animals, specifically dogs, from the food or water left for cats. Other features of the invention have been disclosed that add to further ease the user in protecting a cat's food, facilitating clean-up, and excluding larger animals, but are not intended to be limited to the particular details disclosed herein.

What is claimed is:

1. A cat feeder assembly comprising:
   a housing structure including at least two walls, each of the at least two walls having a bottom end and a top end;
   a food placement zone including a food container located between the at least two walls;
   a protective awning coupled to the housing structure and having a selectively adjustable height, the awning including:
      a downwardly angled portion extending away from the at least two walls, and a leading edge at a lower edge of the downwardly angled portion defining a primary height barrier to the food placement zone; and
      a rear face coupled to the housing structure, extending downwardly away from an upper edge of the downwardly angled portion in a direction toward the bottom ends of the at least two side walls, and defining at least one secondary height barrier to the food placement zone, the secondary height barrier being located between the primary height barrier and the at least two walls,
   wherein:
      the primary height barrier projects a first imaginary plane and the secondary height barrier projects a second imaginary plane substantially parallel to the first imaginary plane, the first imaginary plane and the second imaginary plane together defining a keep-out zone disposed directly under the awning, the keep-out zone spanning from the awning down to a plane defined by the bottom ends of the at least two walls;
      the food container located outside of the keep-out zone; and the keep-out zone sharing a border with the food container or located within approximately 2 inches of the food container.

2. The cat feeder assembly according to claim 1, wherein: the housing structure further includes a roof coupled to the at least two walls.

3. The cat feeder assembly according to claim 1, wherein: one of the at least two walls defines a window therein.

4. The cat feeder assembly according to claim 1, wherein: the housing structure defines a first vertical plane that is substantially parallel and substantially adjacent to the second imaginary plane.

5. The cat feeder assembly according to claim 1, wherein the protective awning comprises:
   a first side face; and
   a second side face,
   wherein the first and second side faces are substantially continuous surfaces free of openings.

6. The cat feeder assembly according to claim 5, wherein: the first and second side faces are substantially planar.

7. The cat feeder assembly according to claim 5, wherein: each of the first side face and second side face are defined by at least three edges.

8. The cat feeder assembly according to claim 1, wherein: the food container is removably couplable to the housing structure.

9. The cat feeder assembly according to claim 8, wherein the food container comprises:
   an upper surface;
   a first feeding dish disposed on the upper surface; and
   a raised area extending in a direction away from the upper surface.

10. The cat feeder assembly according to claim 9, wherein: the food container includes a second feeding dish disposed on the upper surface.

11. The cat feeder assembly according to claim 8, wherein the food container further comprises:
   a portion shaped to couple and engage with a portion of at least one of the at least two walls.

12. A cat feeder assembly comprising:
   a housing structure including at least two vertical walls, the at least two vertical walls:
      defining a food placement zone therein;
      each having a bottom end and a top end; and
      defining a first vertical plane substantially adjacent to the food placement zone;
   a roof coupled to the at least two vertical walls and presenting an upper barrier to the food placement zone;
   a food container that is removably couplable to the housing structure and within the food placement zone;
   a protective awning coupled to the housing structure and having a selectively adjustable height, the awning including:
      a downwardly angled portion extending away from the at least two vertical walls, and a leading edge at a lower edge of the downwardly angled portion defining a primary height barrier to the food placement zone; and
      a rear food blocking member extending continuously and downwardly across a length of an upper edge of the downwardly angled portion and terminating at a trailing edge, the trailing edge disposed above the bottom ends of the at least two vertical walls and defining at least one secondary height barrier to the food placement zone, the secondary height barrier to the food placement zone, the secondary height barrier being located between the primary height barrier and the first plane, wherein the primary height barrier projects a first imaginary plane and the secondary height barrier projects a second imaginary plane substantially parallel to the first imaginary plane, the first imaginary plane and the second imaginary plane together defining a keep-out zone spanning from the awning to a plane defined by the bottom ends of the at least two vertical walls and sharing a border with or located within approximately 2 inches of the food container.

13. A method of providing access to pet food, the method comprising:

providing a cat feeder assembly that includes:
- a housing structure including at least two walls, each of the at least two walls having a bottom end and a top end;
- a food placement zone including a food container located between the at least two walls;
- a protective awning coupled to the housing structure and having a selectively adjustable height, the awning including:
  - a downwardly angled portion extending away from the at least two vertical walls, and a leading edge at a lower edge of the downwardly angled portion defining a primary height barrier to the food placement zone; and
  - a rear food blocking member extending continuously and downwardly across a length of an upper edge of the downwardly angled portion and terminating at a trailing edge, the trailing edge disposed above the bottom ends of the at least two walls and defining at least one secondary height barrier to the food placement zone, the secondary height barrier being located between the primary height barrier and the at least two walls, wherein the primary height barrier projects a first imaginary plane and the secondary height barrier projects a second imaginary plane substantially parallel to the first imaginary plane, the first imaginary plane and the second imaginary plane together defining a keep-out zone disposed directly under the awning, the keep-out zone spanning from the awning to a plane defined by the bottom ends of the at least two walls and sharing a border with or located within approximately 2 inches of the food container; and mechanically adjusting the protective awning to a position that allows an animal of a first size to comfortably access the food placement zone while discriminating against an animal of a second size larger than the first size.

14. The method according to claim 13, further comprising:
providing a roof that is coupled to the at least two walls and presents an upper barrier to the food placement zone.

15. The method according to claim 13, wherein:
the housing structure defines a first vertical plane that is substantially parallel and substantially adjacent to the second imaginary plane.

16. The method according to claim 13, wherein the protective awning further comprises:
a first side face; and
a second side face,
wherein the first and second side faces are substantially enclosed surfaces.

17. The method according to claim 13, wherein:
the food container is removably couplable to the housing structure.

18. The method according to claim 17, wherein:
the food container includes an upper feeding portion, the upper feeding portion having a first feeding dish disposed thereon.

19. The method according to claim 18, wherein:
the upper feeding portion has a second feeding dish disposed thereon.

20. The method according to claim 17, wherein:
the food container further includes a portion shaped to couple and engage with a portion of at least one of the at least two walls.

* * * * *